United States Patent [19]

Buzak et al.

[11] Patent Number: 4,917,463
[45] Date of Patent: Apr. 17, 1990

[54] CHARGE MODULATION COMPENSATED LIQUID CRYSTAL LIGHT VALVE HAVING THE FIRST AND SECOND ELECTRIC FIELDS COOPERATING TO PROVIDE A DIVERGENT ELECTRON LENS EFFECT

[75] Inventors: Thomas S. Buzak, Beaverton; Rolf S. Vatne, Portland; Dana E. Whitlow, Aloha, all of Oreg.

[73] Assignee: Tektronix, Inc., Beaverton, Oreg.

[21] Appl. No.: 46,806

[22] Filed: May 5, 1987

[51] Int. Cl.$^4$ .......................... G02F 1/13; G09G 1/06
[52] U.S. Cl. ................... 350/331 R; 340/720; 315/365; 358/242
[58] Field of Search ............ 350/331 R; 340/720, 340/734; 315/365, 13.11; 328/123, 124; 313/370, 377; 358/242, 251

[56] References Cited

U.S. PATENT DOCUMENTS

| | | | |
|---|---|---|---|
| 2,964,672 | 7/1959 | Nixon | 340/720 |
| 3,627,408 | 12/1971 | Fergason | 350/331 R |
| 3,774,066 | 11/1973 | Kazan | 340/720 |
| 4,119,367 | 10/1978 | Raynes et al. | 350/333 X |

OTHER PUBLICATIONS

Kazan et al., *Electronic Image Storage*, Academic Press, 1968, pp. 132 & 307-312.
Haven, "Electron-Beam Addressed Liquid-Crystal Light Valve", IEEE Trans. on Elec. Dev., vol. ED-30, No. 5, May, 1983.
Milman et al., *Electronic Devices and Circuits*, pp. 158-161, McGraw Hill, 1967.

Primary Examiner—Stanley D. Miller
Assistant Examiner—Huy K. Mai
Attorney, Agent, or Firm—John D. Winkelman; Mark M. Meininger

[57] ABSTRACT

A liquid crystal light valve (10) includes compensation for wire shadow effects caused by the interception of writing beam primary electrons as they propagate through the collector electrode (66). The wire shadows stem from the lack of charge deposited on target surface regions (106) intended to be addressed by the writing electron beam (60a). The present invention applies to the collector electrode an appropriate voltage that diverts the paths (112) of nonintercepted writing beam electrons toward target surface regions directly below the collector electrode portions that intercepted the writing beam electrons. Diverting the paths of nonintercepted electrons provides a more uniform charge distribution on the target surface (45) and thereby fills the charge voids created by the electron intercepting portions of the collector electrode.

15 Claims, 3 Drawing Sheets

CHARGE MODULATION COMPENSATED LIQUID CRYSTAL LIGHT VALVE HAVING THE FIRST AND SECOND ELECTRIC FIELDS COOPERATING TO PROVIDE A DIVERGENT ELECTRON LENS EFFECT

TECHNICAL FIELD

The present invention relates to electron beam addressed liquid crystal light modulators or "valves" of the cathode-ray tube type and, in particular, to such light valves that employ secondary electron collector electrodes that are positioned in the path of a writing electron beam.

BACKGROUND OF THE INVENTION

A liquid crystal light valve that includes a liquid crystal cell of the twisted nematic type positioned between first and second light polarizers is described in copending U.S. patent application of Buzak et al., Liquid Crystal Light Valve with Electrically Switchable Secondary Electron Collector Electrode, filed concurrently herewith. The liquid crystal cell includes a dielectric target surface positioned within an evacuated envelope, an optically transparent faceplate positioned in opposed relation to the target surface, and a liquid crystal material captured between the target surface and the faceplate.

Visible light emanating from a light source propagates through the first polarizer to illuminate the liquid crystal cell. A writing electron gun and an erasing electron gun communicate with the interior of the evacuated envelope and direct toward the target surface of the liquid crystal cell a writing beam and an erasing beam, respectively. The writing beam and the erasing beam sequentially strike preselected locations on the target surface to cause an emission of secondary electrons and thereby develop an electrostatic potential at such preselected locations. The emission of secondary electrons is accomplished in accordance with beam current modulation at the preselected locations, which define the display image.

A secondary electron collector electrode of, for example, the wire mesh type or the wire grid type is positioned over and in substantially parallel spaced-apart relation to the target surface collects in a generally uniform manner the secondary electrons emitted by all regions of the target surface. The writing beam and the erasing beam are directed through the collector electrode and toward the target surface. A collector electrode controller circuit sequentially applies first and second potential differences between the target surface and the collector electrode in synchronism with the striking of the preselected locations by the respective writing and erasing beams.

The first potential difference causes the collector electrode to collect a sufficient number of the secondary electrons to maintain the electrostatic potential at the preselected locations on the target surface. This causes the liquid crystal cell to transmit light in a first polarization sense. The second potential difference causes the collector electrode to collect a relatively small number of the secondary electrons. The remaining secondary electrons redistribute over the target surface and change the electrostatic potential at the preselected location. This causes the liquid crystal cell to transmit light in a second polarization sense. The light transmitted by the liquid crystal cell propagates through the second polarizer which transmits light in one of the first and second polarization senses to provide the display image.

Since the writing beam is directed through the collector electrode and toward the target surface, some of the writing electrons strike the wire segments of the collector electrode. These electrons are intercepted by the collector electrode and are not transmitted toward the target surface. This causes unwanted charge modulation on the target surface and results in the casting of wire shadows by the collector electrode on areas of the target surface aligned with the wire segments. The wire shadows prevent the writing beam from addressing the areas they obscure and superimpose collector electrode artifacts on the displayed image.

SUMMARY OF THE INVENTION

An object of this invention is to provide a liquid crystal light valve in which collector electrode artifacts are imperceptible in a display image.

Another object of this invention is to provide in such a light valve, compensation that minimizes the formation of wire shadows in the display image.

The present invention includes means for compensating for wire shadow effects caused by the interception of writing beam primary electrons as they propagate through the collector electrode. The wire shadows stem from the lack of charge deposited on target surface regions intended to be addressed by the writing electron beam. The present invention applies to the collector electrode an appropriate voltage that diverts the paths of nonintercepted writing beam electrons toward target surface regions directly below the collector electrode portions that intercepted the writing beam electrons. Diverting the paths of nonintercepted electrons provides a more uniform charge distribution on the target surface and thereby fills the charge voids created by the electron intercepting portions of the collector electrode.

A more complete understanding of the present invention and its various features, advantages and objectives may be had by referring to the following detailed description and the accompanying drawings.

DETAILED DESCRIPTION OF THE INVENTION

Figure 1:
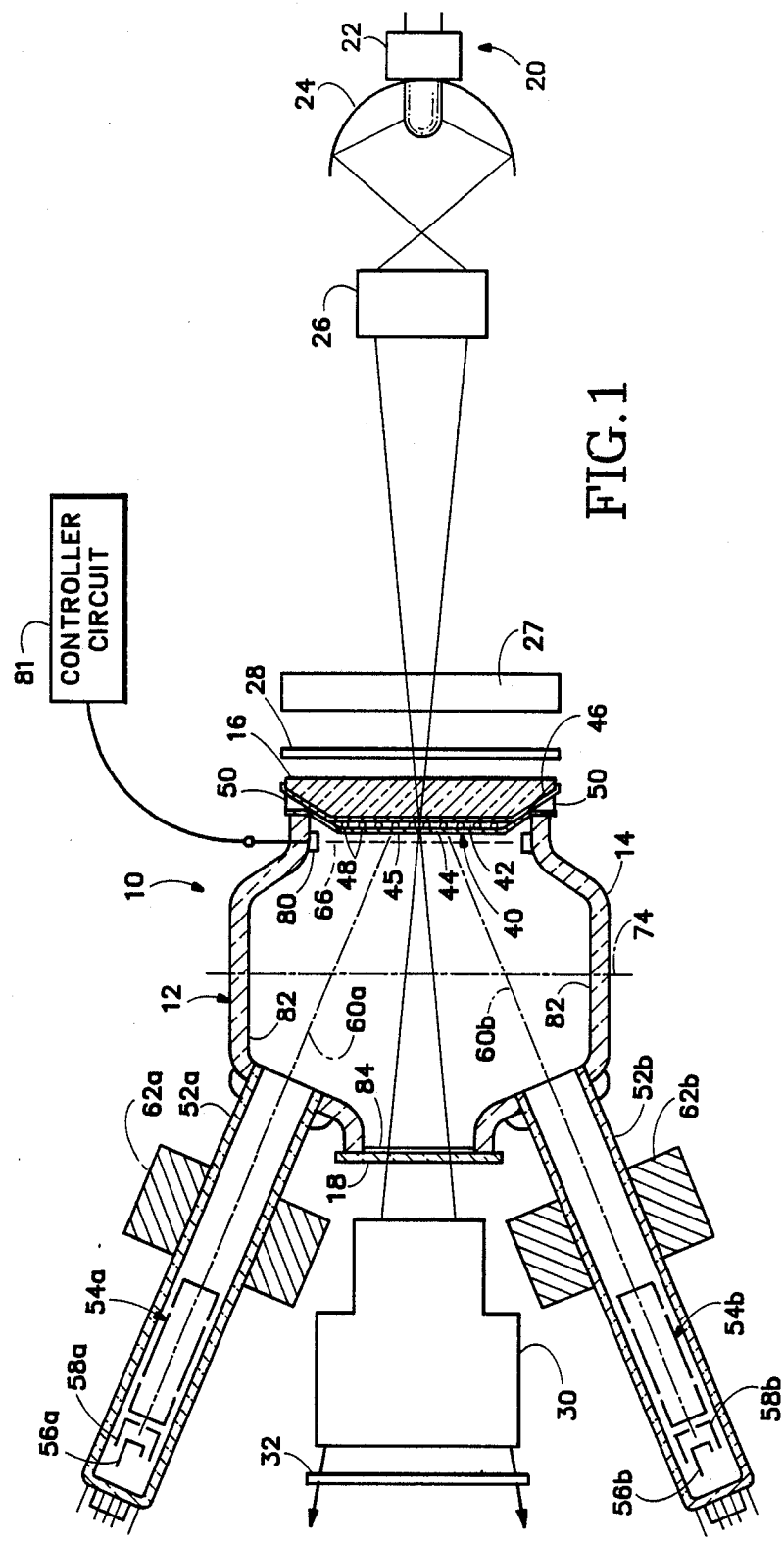
FIG. 1 is a schematic cross sectional view of an electron beam addressed liquid crystal light valve and related projection system elements provided in accordance with the present invention.

The operation of an electron beam addressed liquid crystal light valve according to the present invention is described herein by way of example only to the projection image display apparatus shown in FIG. 1. The illustrated apparatus includes an electron beam addressed liquid crystal light valve 10 having an evacuated envelope 12 comprising a ceramic body 14, an optically transparent entry window or faceplate 16 and an optically transparent exit window 18 mounted thereto.

Light from a suitable source 20, which in this instance comprises a projection lamp 22 and a parabolic reflector 24, is directed by an input lens system 26 and a field lens system 27 through a neutral density linear polarizing filter 28 into faceplate 16. Input lens system 26 reformats the size of the area illuminated by light source 20, and field lens system 27 steers the light in the proper direction to propagate through window 18. The light exiting faceplate 18 is projected by a projection lens system 30 through a neutral density linear polarizing filter or analyzer 32 and toward a remote viewing surface (not shown). Polarizing filter 28 and analyzer 32 are arranged so that their light transmitting axes are aligned parallel to each other. Skilled persons would appreciate that light valve 10 can be configured to operate with orthogonally aligned light transmitting axes of polarizing filter 28 and analyzer 32.

Light valve 10 has an internal liquid crystal cell 40 (enlarged in FIG. 1 for clarity) which is disposed in the path of the polarized projection light entering envelope 12 through faceplate 16. Cell 40 comprises a layer 42 of a nematic liquid crystal material captured between faceplate 16 and a thin, optically transparent target substrate 44 having a target surface 45. Target substrate 44 is formed of a suitable dielectric material such as glass, a polyimide, or mica, the last-mentioned of which being preferred. The mica can be coated with a layer of magnesium oxide (MgO) as described in copending U.S. patent application of Haven et al., Electron BeamAddressed Liquid Crystal Cell, filed concurrently herewith. The MgO coating provides a relatively high secondary electron emission ratio. The edges of the faceplate 16 and substrate 44 are sealed to the body 14 with ceramic frit seals 50 or other suitable material. Preferably the cell is assembled with the target substrate stretched over spacers 48 in the manner described in copending U.S. patent application of Chitwood et al., Liquid Crystal Cell and Method of Assembly of Same, filed concurrently herewith. The resulting tension stresses in the target substrate secure the substrate in place so that the cell will maintain a uniform thickness.

An optically transparent conductive film 46 of indium tin oxide (ITO) covering the inner surface of faceplate 16 serves as a backplate electrode for the cell. A DC voltage is applied to conductive film 46 to make it greatly more positive than the voltage of the cathode of the writing electron gun, as will be described below. Target substrate 44 is maintained at a predetermined distance from film 46 by a plurality of spacers 48 of substantially uniform height. Preferably, numerous small spacers (glass beads or photolithographically fabricated spacers) are distributed fairly uniformly throughout the space between faceplate 16 and target substrate 44.

The confronting surfaces of target substrate 44 and ITO film 46 are treated to provide a homogeneous (i.e., parallel) surface alignment of the nematic material captured between them. The alignment directions of the two surfaces are arranged at right angles to provide a 90-degree twist cell. The desired surface orientation is provided in a known manner, such as by vacuum-depositing silicon monoxide (SiO) onto the surfaces at an angle of about five degrees.

Nematic liquid crystal materials suitable for use in cell 40 include a nematic liquid crystal material commercially available from E. Merck as ZLI 2244. Ideally, the nematic liquid crystal material should have a low dielectric constant and low viscosity at room temperature. Materials having such characteristics are preferable because they minimize the writing beam current required to switch the cell at speeds necessary to provide standard monochrome television image displays.

The molecules of the nematic liquid crystal material in layer 42 are ordered such that the polarization direction of plane polarized light passing through the cell is rotated 90 degrees in the absence of an applied electric field (i.e., in the "OFF" state). Whenever a potential difference is applied across any given region of the liquid crystal material, the longitudinal axes of the liquid crystal molecules in that region tend to orient themselves in a direction parallel to the resulting field, thereby decreasing the amount of rotation of the polarization direction of the light passing through that region of the cell 40. If the potential difference across cell 40 is of sufficient magnitude (i.e., in the "ON" state), the polarization direction of the light passing through that region of the cell is substantially unchanged. Since the light-transmitting axes of both polarizing filter 28 and analyzer 32 are aligned in the same direction, light passes through and is blocked by analyzer 32 whenever the light propagates from regions of cell 40 that are in the "ON" state and the "OFF" state, respectively.

Envelope 12 further comprises first and second similar elongate tubular glass necks 52a and 52b, one end of each neck being frit sealed to body 14 adjacent window 18. A writing electron emitting means or gun 54a is mounted within neck 52a. Gun 54a includes a cathode 56a, a control grid 58a, and associated electrodes for forming a narrow electron beam 60a that is directed at an oblique angle relative to and toward target substrate 44 of liquid crystal cell 40. Conductive film 46 is held at a very large positive potential relative to the potential applied to cathode 56a of gun 54a and, therefore, contributes to the acceleration potential of writing beam 60a. Video or other input signals are applied to grid 58a to modulate electron beam 60a in accordance with the video image to be projected onto the remote viewing surface.

Figure 2:
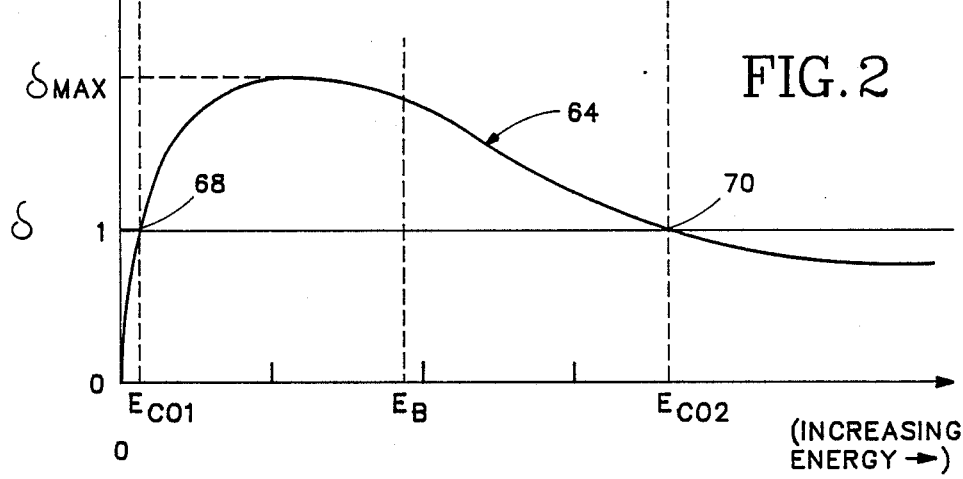
FIG. 2 is a graph of the secondary electron emission ratio curve as a function of the energy of incident electrons that strike a target substrate incorporated in the light valve of FIG. 1.

FIG. 2 shows the secondary electron emission ratio curve 64 as a function of incident electron energy for target substrate 44. The beam current modulated writing beam 60a is raster scanned across target surface 45 of target substrate 44 in response to suitable electrical signals supplied by deflection circuitry (not shown) to an electromagnetic deflection yoke 62a supported on neck 52a. (Light valve 10 could alternatively be constructed with an electrostatic deflection structure.)

Writing gun 54a is operated so that the electrons in beam 60a strike target surface 45 with an energy $E_B$, which causes the emission of secondary electrons with a secondary electron ratio δ greater than 1. (The secondary electron emission ratio is defined as the number of secondary electrons emitted by target substrate 44 for each incident electron striking target substrate 44.) The energy $E_B$ of writing beam 60a is greater than the energy $E_{CO1}$, which corresponds to the first unity crossover point 68 of curve 64, but is less than the energy $E_{CO2}$, which corresponds to the second unity crossover point 70 of curve 64. The number of secondary electrons generated by writing beam 60a is, therefore, greater than the number of writing electrons that strike target surface 45.

Figure 5:
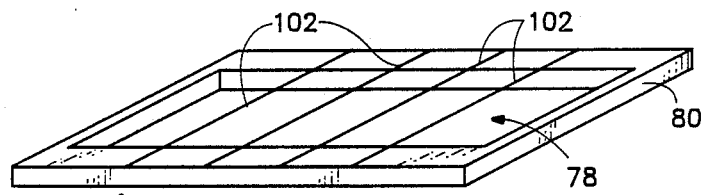
FIG. 5 shows the construction of the collector electrode incorporated in the light valve of FIG. 1.

Secondary electron collector electrode 66 can be of the grid type or mesh type and is positioned over and in substantially parallel, spaced apart relation to target surface 45. Collector electrode 66 is spaced apart from target surface 45 by a distance of about 2.54 millimeters. Collector electrode 66 comprises, for example, a grid of parallel wire segments formed by attaching segments of wire 78 of about 5 microns in diameter to a frame 80, as shown in FIG. 5. A grid-type collector electrode is used whenever the beam diameter is approximately equal to or smaller than the pitch of a mesh-type collector electrode. Writing beam 60a is directed through collector electrode 66 and toward target surface 45.

Whenever writing beam 60a is raster scanned over target surface 45 during a first time interval, a collector electrode controller circuit or biasing means 81 applies to collector electrode 66 a positive potential of about +300 volts relative to the potential on conductive film 46. Collector electrode 66 collects, therefore, the secondary electrons emitted from target surface 45. Since the secondary electron emission ratio for writing beam 60a is greater than one and the secondary electrons are collected by mesh electrode 66, the areas of target surface 45 written or addressed by writing beam 60a have a positive electrostatic potential.

An erasing electron emitting means or gun 54b is mounted within neck 52b. Gun 54b includes a cathode 56b, a control grid 58b, and associated electrodes for forming a narrow electron beam 60b that is directed at an oblique angle relative to and toward target substrate 44 of liquid crystal cell 40. After a complete raster scan of target surface 45 by writing beam 60a, erasing beam 60b is raster scanned across target surface 45 in response to suitable electrical signals supplied by deflection circuitry (not shown) to an electromagnetic deflection yoke 62b supported on neck 52b, thereby to complete a video image field. Erasing gun 54b is operated in a manner similar to that of writing gun 54a. The electrons in beam 60b strike target surface 45 with the energy $E_B$. There is no need for, but there could be, modulation of the beam current of erasing beam 60b during the raster scan of target surface 45.

Whenever erasing beam 60b is raster scanned across target surface 45 during a second time interval, collector electrode controller circuit 81 applies to collector electrode 66 a potential of about zero volts relative to the potential on conductive film 46. Such a potential on collector electrode 66 causes the secondary electrons to redeposit primarily on target surface 45 and thereby erase the image that had previously been addressed by writing beam 60a. The effect of collector electrode 66 is to stabilize at zero volts the electrostatic potential of any point on target surface 45 relative to the potential on conductive film 46. This would be true for any energy value of erasing beam 60b between $E_{CO1}$ and $E_{CO2}$. The image can, of course, be maintained by rewriting it at a suitable refresh rate. In a 60 Hz noninterlaced display monitor for computers, for example, each field would be scanned every 16 ⅔ milliseconds by the writing beam, but information would be written in alternate fields. The display would be erased in the field during which no writing takes place. Therefore, the information refresh rate would be 33.33 milliseconds.

A conductive coating 82 on the interior surface of ceramic body 14 is electrically connected to a conductive film 84 of ITO on the inner surface of window 18. Coating 82 and film 84 are connected to a potential of about 100 volts more positive than the maximum potential (i.e., +300 volts relative to conductive film 46) of collector electrode 66 and prevent the inner surfaces of respective body 14 and window 18 from accumulating electrical charge during the operation of light valve 10.

Figure 3:
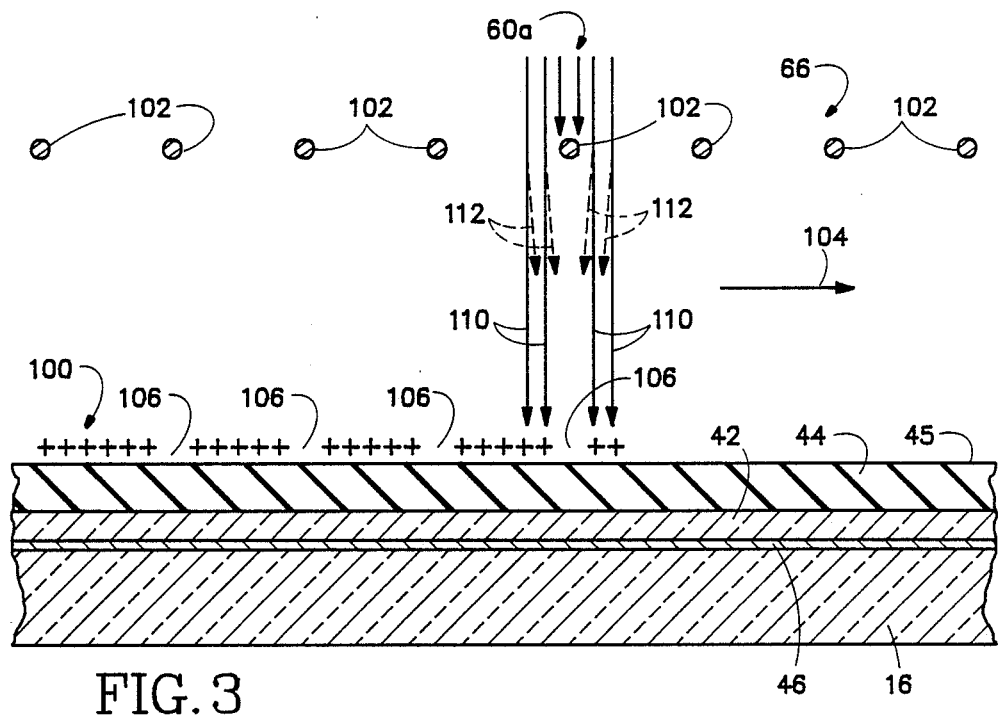
FIG. 3 is a schematic cross sectional view of the liquid crystal cell and the secondary electron collector showing the formation of electron shadows on the target surface of the liquid crystal cell.

FIG. 3 shows a distribution 100 of positive charges that wire segments 102 of collector electrode 66 develop as writing beam 60a is raster scanned in a direction 104 across target surface 45. Wire segments 102 intercept some of the electrons in writing beam 60a, thereby causing the formation of wire shadows at the areas 106 of target surface 45 that are perpendicularly aligned with wire segments 102. Areas 106 of target surface 45 cannot be addressed by writing beam 60a and, therefore, cannot be driven by writing beam 60a into the "ON" state. As a consequence, an image projected by light valve 10 will have within it a series of stripes that correspond to the wire shadows caused by the presence of collector electrode 66.

Figure 4:
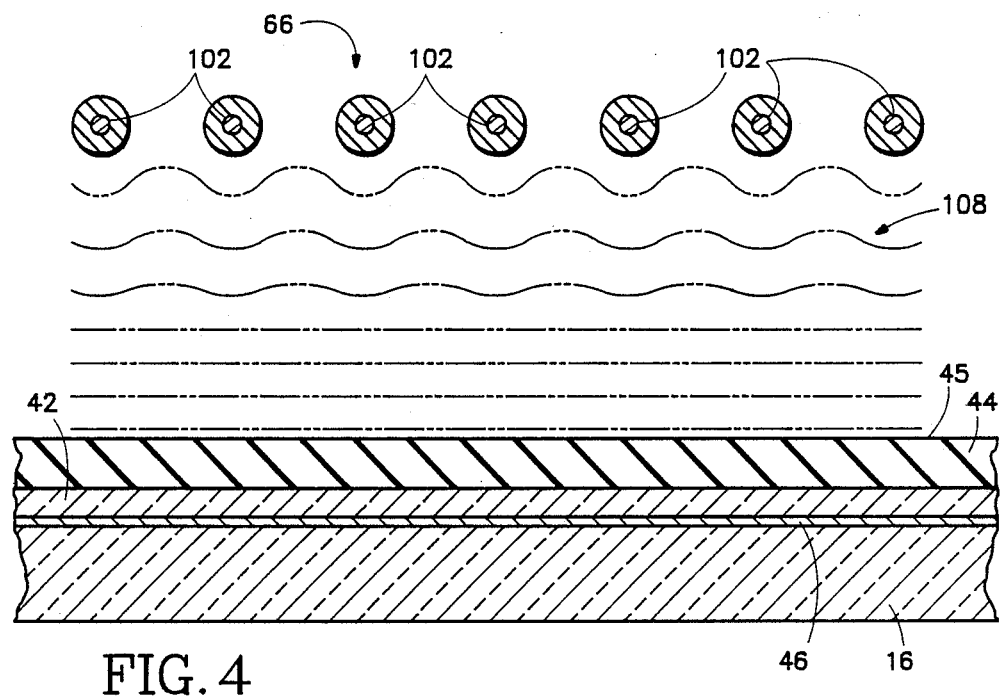
FIG. 4 is a schematic cross sectional view of the liquid crystal cell and the secondary electron collector showing representative equipotential lines created by the application of a potential difference between the liquid crystal cell and the secondary electron collector.

FIG. 4 shows representative equipotential lines 108 created between collector electrode 66 and target surface 45 when collector electrode 66 receives a potential of about +300 volts relative to the potential on conductive film 46. With reference to FIGS. 1, 3, and 4, collector electrode 66 receives the positive potential while writing beam 60a is raster scanned across target surface 45, thereby to collect the secondary electrons emitted by target surface 45. The +300 volt potential difference between conductive film 46 and collector electrode 66 creates a first electric field $E_1$ in the space between collector electrode 66 and target surface 45.

Simultaneously, conductive coating 82 and ITO film 84 receive a potential of about +100 volts relative to the potential on collector electrode 66. This +100 volt potential difference creates a second electric field $E_2$ in the space between collector electrode 66 and ITO film 84 and conductive coating 82. An electric field difference $\Delta E = E_1 - E_2$ is, therefore, present across collector electrode 66.

The electric field difference $\Delta E$ is directly proportional to the potential applied to collector electrode 66. The electrons in writing beam 60a propagating through the electric field difference $\Delta E$ are deflected from their nominal paths 110 and converge toward target surface 45 along paths 112 (shown in phantom). Electrons deflected in this manner strike target surface 45 at locations that are displaced from undeflected landing locations by a distance X. The displacement distance X can be expressed as:

$$X = \frac{(P/2 - Y) \times S \times \Delta E}{2V}$$

in which

X = electron displacement from undeflected landing position;

Y = distance from electron to nearest wire segment 102 as writing beam 60a propagates through collector electrode 66;

S = distance from collector electrode 66 to target surface 45;

P = spacing between next adjacent wire segments 102;

$\Delta E$ = difference between the electric fields $E_1$ and $E_2$;

V = potential difference between collector electrode 66 and cathode 56a of writing gun 60a.

With particular reference to FIG. 5, collector electrode 66 comprises a plurality of parallel wire segments 102 that are secured to rectangular, ceramic frame 80 with frit seals. Wire segments 102 are attached to frame 80 at the pitch P so that each wire segment 102 is separated from next adjacent wire segments 102 by a fixed distance of typically between 0.2 millimeters and 0.5 millimeters.

Collector electrode 66 is separated from target surface 45 by the distance S, which is preferably about 2.54 millimeters but can typically range between 2 and 4 millimeters. At each instant that writing beam 60a propagates between next adjacent wire segments 102, electrons in writing beam 60a are separated from a nearest wire segment 102 by the distance Y. The wire shadows can be substantially eliminated by applying to collector electrode 66 a potential that causes electrons passing near each wire segment 102 to be displaced from their undeflected landing positions by a distance X which is approximately equal to ½ the diameter of wire 78. This aspect of the present invention is especially advantageous because a secondary electron collection field of suitable strength is maintained at the same time.

Figure 6:
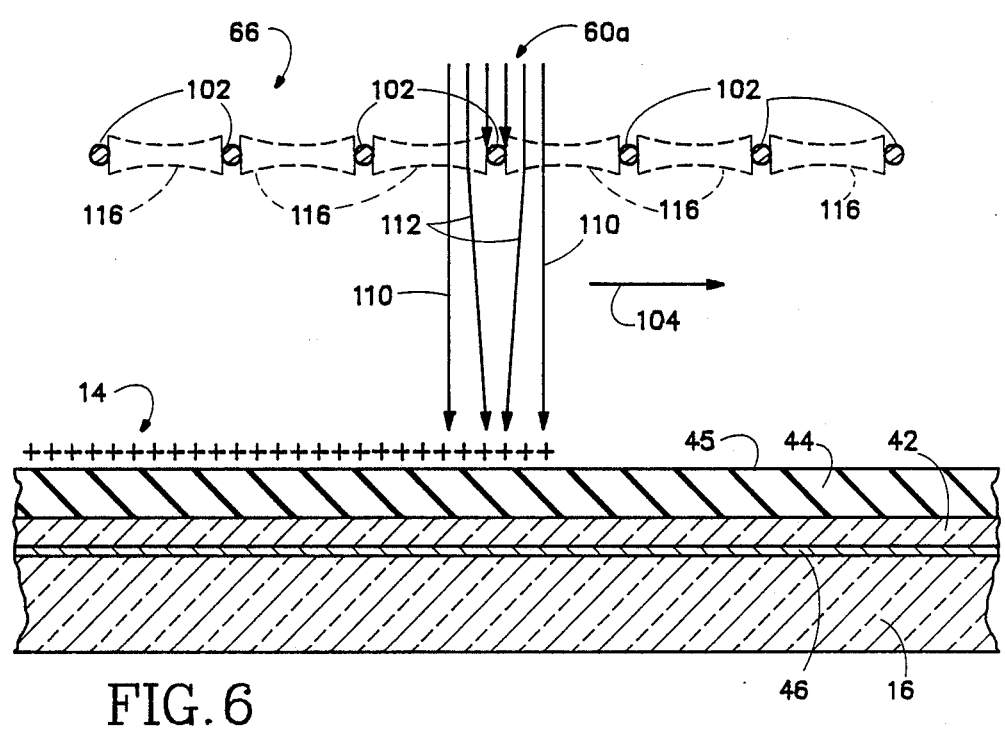
FIG. 6 is a schematic cross sectional view of the liquid crystal cell and the secondary electron collector showing the elimination of wire shadows in accordance with the present invention.

FIG. 6 shows a substantially uniform charge distribution 114 that is formed over target surface 45 when the displacement X of electrons passing near wire segments 102 is approximately equal to ½ the diameter of wire 78 (FIG. 5). Collector electrode 66 still intercepts writing beam 60a as it is raster scanned in direction 104 across target surface 45. Wire shadows are not formed, however, because electrons that pass near wire segments 102 are deflected by the distance X Which is about ½ the diameter of wire 78. Since electrons are directed past two sides of each wire segment 102 and the displacement X is about ½ the diameter of wire 78, electrons are distributed in a substantially uniform manner in areas 106 that are aligned with wire segments 102. As a result, substantially all of target surface 45 can be addressed by writing beam 60a and, therefore, can be driven by writing beam 60a into the "ON" state, thereby eliminating the image degradation caused by the wire shadows.

Each pair of next adjacent wire segments 102 can be characterized as a diverging electron lens 116 (shown in phantom). Writing electrons that pass "through" each lens 116 are diverted away from the center of the lens and, as a result, propagate toward areas 106 of target surface 45 that are perpendicularly aligned with wire segments 102. Lenses 116 provide a schematic representation of the effect of wire segments 102 on writing beam 60a.

While the invention has been described in relation to a preferred embodiment, it is to be understood that various alterations, substitutions of equivalents and other changes can be made without departing from the underlying principles of the invention. For example, certain types of liquid crystal cells do not require polarized light to modulate incident light electro-optically. As another example, the liquid crystal cell can be operated in more than two states to provide images of different gray scale intensities. The scope of the invention is defined, therefore, in the appended claims.

We claim:

1. In an electron beam-addressed liquid crystal light modulator having writing means positioned within an evacuated envelope for emitting a writing beam of primary electrons that propagate along beam paths and strike a target surface of a liquid crystal cell to cause the emission of secondary electrons from the target surface and thereby address selected regions on the target surface, the improvement comprising:

an optically semi-transparent electrode structure spaced apart from and positioned over a substantial portion of the target surface, the electrode structure defining within the evacuated envelope a boundary between first and second electric field regions, the first electric field region being located between the electrode structure and the target surface and the second electric field region being located between the electrode structure and the writing means; and compensation means generating first and second electric fields in the respective first and second electric field regions for eliminating shadow effects produced on the target surface by interception of the writing beam primary electrons by the electrode structure, the first and second electric fields cooperating to provide a lens effect that deflects the beam paths of the writing beam primary electrons propagating through the electrode structure to landing positions on the target surface that distribute the electrons substantially uniformly over the target surface and thereby eliminate the shadow effects.

2. The light modulator of claim 1 in which the electrode structure comprises plural spaced-apart wire segments.

3. The light modulator of claim 2 in which the electrode structure comprises a conductive mesh.

4. The light modulator of claim 2 in which the electrode structure comprises a conductive grid.

5. The light modulator of claim 1 in which the compensation means includes a first electrically conductive layer spaced apart from the target surface by the liquid crystal cell, and which further includes first biasing means applying a first potential difference between the electrode structure and the first conductive layer to generate the first electric field in the first electric field region.

6. The light modulator of claim 5 in which the compensation means further includes a second electrically conductive layer positioned on a portion of the inner surface of the evacuated envelope bounding the second electric field region, and which further includes second biasing means applying a second potential difference between the electrode structure and the second conductive layer to generate the second electric field in the second electric field region.

7. The light modulator of claim 6 in which the writing means includes means for emitting an erasing beam of primary electrons that erase previously addressed regions on the target surface, the writing beam and the erasing beam strike the target surface during nonoverlapping respective first and second time intervals, and the first potential difference is of different values during the first and second time intervals.

8. The light modulator of claim 1 in which the compensation means includes a second electrically conductive layer positioned on a portion of the inner surface of the evacuated envelope bounding the second electric field region, and which further includes second biasing means applying a second potential difference between the electrode structure and the second conductive layer to generate the second electric field in the second electric field region.

9. The light modulator of claim 1 in which the writing means includes a cathode that emits the primary electrons and receives a potential, V, relative to the electrode structure, the electrode structure is spaced apart from the target surface by a distance, S, and the first and second electric fields have intensities differing by an amount proportional to V/S.

10. In an electron beam-addressed liquid crystal light modulator having writing means positioned within an evacuated envelope for emitting a writing beam of primary electrons that propagate along beam paths and strike a target surface of a liquid crystal cell to cause the emission of secondary electrons from the target surface, the writing beam addressing selected regions on the target surface and being directed through an optically semi-transparent electrode structure spaced apart from and positioned over a substantial portion of the target surface, a method for eliminating shadow effects produced on the target surface by interception of the writing beam primary electrons by the electrode structure, comprising:

generating a first electric field in a region between the electrode structure and the target surface; and generating a second electric field in a region between the electrode structure and the writing means, the first and second electric fields cooperating to provide a lens effect that deflects the beam paths of the writing beam primary electrons propagating through the electrode structure to landing positions on the target surface that distribute the electrons substantially uniformly over the target surface and thereby eliminate the shadow effects.

11. The method of claim 10 in which the light modulator includes a first electrically conductive layer spaced apart from the target surface by the liquid crystal cell, and which further includes first biasing means applying a first potential difference between the electrode structure and the first conductive layer to generate the first electric field.

12. The method of claim 11 in which the light modulator further includes a second electrically conductive layer positioned on a portion of the inner surface of the evacuated envelope bounding the region between the electrode structure and the writing means, and which further includes second biasing means applying a second potential difference between the electrode structure and the second conductive layer to generate the second electric field.

13. The method of claim 12 in which the writing means includes means for emitting an erasing beam of primary electrons that erase previously addressed regions on the target surface, the writing beam and the erasing beam strike the target surface during nonoverlapping respective first and second time intervals, and the first potential difference is of different values during the first and second time intervals.

14. The method of claim 10 in which the light modulator includes a second electrically conductive layer positioned on a portion of the inner surface of the evacuated envelope bounding the region between the electrode structure and the writing means, and which further includes second biasing means applying a second potential difference between the electrode structure and the second conductive layer to generate the second electric field.

15. The method of claim 10 in which the writing means includes a cathode that emits the primary electrons and receives a potential, V, relative to the electrode structure, the electrode structure is spaced apart from the target surface by a distance, S, and the first and second electric fields have intensities differing by an amount proportional to V/S.

* * * * *